United States Patent
Braswell et al.

(10) Patent No.: US 12,165,222 B2
(45) Date of Patent: Dec. 10, 2024

(54) IMAGERY-BASED BOUNDARY IDENTIFICATION FOR AGRICULTURAL FIELDS

(71) Applicant: Indigo Ag, Inc., Boston, MA (US)

(72) Inventors: Bobby Harold Braswell, Portsmouth, NH (US); Tina A. Cormier, Brunswick, ME (US); Damien Sulla-Menashe, Cambridge, MA (US); Keith Frederick Ma, Cambridge, MA (US)

(73) Assignee: INDIGO AG, INC., Charleston, MA (US)

( * ) Notice: Subject to any disclaimer, the term of this patent is extended or adjusted under 35 U.S.C. 154(b) by 348 days.

(21) Appl. No.: 17/681,126

(22) Filed: Feb. 25, 2022

(65) Prior Publication Data

US 2022/0180526 A1     Jun. 9, 2022

Related U.S. Application Data

(63) Continuation of application No. PCT/US2020/048188, filed on Aug. 27, 2020.
(Continued)

(51) Int. Cl.
   *G06K 9/00*           (2022.01)
   *G06Q 50/02*        (2012.01)
   (Continued)

(52) U.S. Cl.
   CPC ............ *G06Q 50/02* (2013.01); *G06T 5/70* (2024.01); *G06T 7/11* (2017.01); *G06T 7/13* (2017.01);
   (Continued)

(58) Field of Classification Search
   CPC .......... G06Q 50/02; G06Q 10/06; G06T 5/70; G06T 7/11; G06T 7/13; G06T 7/162;
   (Continued)

(56) References Cited

U.S. PATENT DOCUMENTS

| | | | |
|---|---|---|---|
| 6,422,508 B1 | 7/2002 | Barnes | |
| 7,212,670 B1 * | 5/2007 | Rousselle | ................. G06T 7/62 382/173 |

(Continued)

FOREIGN PATENT DOCUMENTS

| | | |
|---|---|---|
| AU | 2012101249 A4 | 9/2012 |
| CN | 109360117 A | 2/2019 |

(Continued)

OTHER PUBLICATIONS

Ritchie et al ("Sensitivities of Normalized Difference Vegetation Index and a Green/Red Ratio Index to Cotton Ground Cover Fraction" Crop science, vol. 50, May-Jun. 2010). (Year: 2010).*
(Continued)

*Primary Examiner* — Shervin K Nakhjavan
(74) *Attorney, Agent, or Firm* — Fenwick & West LLP

(57) ABSTRACT

Imagery-based boundary identification for agricultural fields is provided. In various embodiments, a time series of surface reflectance rasters for a geographic region is received. For each of the surface reflectance rasters, at least one index raster is determined, yielding at least one time series of index rasters. The at least one time series of index rasters is divided into a plurality of consecutive time windows. The at least one time series of index rasters is composited within each of the plurality of time windows, yielding a composite index raster for each of the at least one time series of index rasters in each of the plurality of time windows. The composite index rasters are segmented into a plurality of spatially compact regions of the geographic region. A plu-
(Continued)

rality of polygons is generated from the plurality of spatially compact regions, each of the plurality of polygons corresponding to an agricultural field in the geographic region.

18 Claims, 12 Drawing Sheets

Related U.S. Application Data

(60) Provisional application No. 62/892,110, filed on Aug. 27, 2019.

(51) Int. Cl.

| | | |
|---|---|---|
| G06T 5/70 | (2024.01) | |
| G06T 7/11 | (2017.01) | |
| G06T 7/13 | (2017.01) | |
| G06T 7/162 | (2017.01) | |
| G06V 10/26 | (2022.01) | |
| G06V 10/30 | (2022.01) | |
| G06V 10/32 | (2022.01) | |
| G06V 10/34 | (2022.01) | |
| G06V 10/60 | (2022.01) | |
| G06V 20/10 | (2022.01) | |

(52) U.S. Cl.
CPC .............. *G06T 7/162* (2017.01); *G06V 10/26* (2022.01); *G06V 10/30* (2022.01); *G06V 10/32* (2022.01); *G06V 10/34* (2022.01); *G06V 10/60* (2022.01); *G06V 20/188* (2022.01); *G06T 2207/10032* (2013.01)

(58) Field of Classification Search
CPC . G06T 2207/10032; G06T 2207/10036; G06T 2207/30188; G06T 7/174; G06V 10/26; G06V 10/30; G06V 10/32; G06V 10/34; G06V 10/60; G06V 20/188; A01B 79/005
See application file for complete search history.

(56) References Cited

U.S. PATENT DOCUMENTS

| | | |
|---|---|---|
| 7,675,549 B1 | 3/2010 | Brower et al. |
| 8,965,812 B2 | 2/2015 | Linville |
| 9,113,590 B2 | 8/2015 | Johnson |
| 9,381,646 B1 | 7/2016 | Fryshman |
| 9,489,576 B2 | 11/2016 | Johnson et al. |
| 9,519,861 B1 | 12/2016 | Gates et al. |
| 9,563,945 B2 | 2/2017 | Fryshman |
| 9,582,002 B2 | 2/2017 | Cavender-Bares |
| 9,582,873 B2 | 2/2017 | Ulman |
| 9,629,306 B2 | 4/2017 | Sauder et al. |
| 9,658,201 B2 | 5/2017 | Redden et al. |
| 9,745,060 B2 | 8/2017 | O'Connor et al. |
| 9,756,844 B2 | 9/2017 | Groeneveld |
| 9,880,140 B2 | 1/2018 | Osborne et al. |
| 9,928,578 B1 * | 3/2018 | Chartrand ............ G06F 18/2413 |
| RE46,968 E | 7/2018 | Linville |
| 10,445,877 B2 * | 10/2019 | Albrecht ................ G06T 7/0012 |
| RE47,742 E | 11/2019 | Linville |
| 10,564,316 B2 | 2/2020 | Xu et al. |
| 10,902,655 B1 | 1/2021 | Snyder |
| 11,100,579 B1 | 8/2021 | Raguse et al. |
| 11,762,125 B2 * | 9/2023 | Xu ........................ G06Q 10/04 |
| | | 702/179 |
| 2003/0019408 A1 | 1/2003 | Fraisse et al. |
| 2005/0234691 A1 | 10/2005 | Singh et al. |
| 2007/0014488 A1 | 1/2007 | Chen et al. |
| 2007/0229524 A1 | 10/2007 | Hendrey et al. |
| 2008/0174593 A1 | 7/2008 | Ham et al. |
| 2009/0037441 A1 | 2/2009 | Howell et al. |
| 2009/0259709 A1 | 10/2009 | Nilkitin |
| 2010/0082564 A1 | 4/2010 | Fernekes |
| 2010/0321399 A1 | 12/2010 | Ellren et al. |
| 2010/0332430 A1 | 12/2010 | Caraviello et al. |
| 2012/0143504 A1 | 6/2012 | Kalai et al. |
| 2012/0191773 A1 | 7/2012 | Appleton |
| 2013/0332205 A1 | 12/2013 | Friedberg et al. |
| 2014/0039967 A1 | 2/2014 | Scharf et al. |
| 2014/0095261 A1 | 4/2014 | Johnson |
| 2014/0222374 A1 | 8/2014 | Lock et al. |
| 2014/0263822 A1 | 9/2014 | Malveaux |
| 2016/0050840 A1 | 2/2016 | Sauder et al. |
| 2016/0071410 A1 | 3/2016 | Rupp et al. |
| 2016/0073573 A1 | 3/2016 | Ethington et al. |
| 2016/0157414 A1 | 6/2016 | Ackerman et al. |
| 2016/0171680 A1 | 6/2016 | Lobell |
| 2016/0180473 A1 * | 6/2016 | Groeneveld ......... A01C 21/007 |
| | | 705/7.25 |
| 2016/0216245 A1 | 7/2016 | Sutton |
| 2016/0232621 A1 | 8/2016 | Ethington et al. |
| 2016/0302351 A1 | 10/2016 | Schildroth et al. |
| 2016/0309646 A1 | 10/2016 | Starr et al. |
| 2017/0041407 A1 | 2/2017 | Wilbur et al. |
| 2017/0083747 A1 | 3/2017 | Guan et al. |
| 2017/0089761 A1 | 3/2017 | McQuilkin et al. |
| 2017/0090068 A1 | 3/2017 | Xiang et al. |
| 2017/0105335 A1 | 4/2017 | Xu et al. |
| 2017/0109395 A1 | 4/2017 | Farah |
| 2017/0112043 A1 | 4/2017 | Nair et al. |
| 2017/0124463 A1 | 5/2017 | Chen et al. |
| 2017/0161627 A1 | 6/2017 | Xu et al. |
| 2017/0168157 A1 | 6/2017 | Hagerman et al. |
| 2017/0169523 A1 | 6/2017 | Xu et al. |
| 2017/0177938 A1 | 6/2017 | Papanikolopoulos et al. |
| 2017/0196171 A1 | 7/2017 | Xu et al. |
| 2017/0199528 A1 | 7/2017 | Detweiler et al. |
| 2017/0206415 A1 | 7/2017 | Redden |
| 2017/0213141 A1 | 7/2017 | Xu et al. |
| 2017/0228475 A1 | 8/2017 | Aldor-Noiman et al. |
| 2017/0231213 A1 | 8/2017 | Gordon et al. |
| 2017/0257426 A1 | 9/2017 | Wilbur et al. |
| 2017/0258005 A1 | 9/2017 | Cutter |
| 2017/0270446 A1 * | 9/2017 | Starr ................ G06Q 10/06313 |
| 2017/0287436 A1 | 10/2017 | Korzunov |
| 2017/0287437 A1 | 10/2017 | Korzunov |
| 2018/0049043 A1 | 2/2018 | Hoffberg |
| 2018/0070527 A1 * | 3/2018 | Richt ................... A01B 79/005 |
| 2018/0075545 A1 | 3/2018 | Richt |
| 2018/0137675 A1 | 5/2018 | Kwant et al. |
| 2018/0211156 A1 | 7/2018 | Guan et al. |
| 2019/0019008 A1 | 1/2019 | Guan et al. |
| 2019/0050948 A1 | 2/2019 | Perry et al. |
| 2020/0008371 A1 | 1/2020 | Hassanzadeh et al. |
| 2022/0067614 A1 | 3/2022 | Guan et al. |
| 2022/0138767 A1 | 5/2022 | Ashtekar et al. |
| 2022/0180526 A1 | 6/2022 | Braswell et al. |
| 2022/0210987 A1 | 7/2022 | Baldo |
| 2022/0215659 A1 | 7/2022 | Melaas et al. |
| 2022/0237888 A1 | 7/2022 | Mohite et al. |
| 2022/0261928 A1 | 8/2022 | Malizia et al. |
| 2022/0342536 A1 | 10/2022 | Bontjes |
| 2022/0343229 A1 | 10/2022 | Gruber et al. |
| 2023/0092057 A1 | 3/2023 | Holden et al. |

FOREIGN PATENT DOCUMENTS

| | | | | |
|---|---|---|---|---|
| CN | 109685081 A | * | 4/2019 | ......... G06K 9/00657 |
| CN | 106529451 B | | 6/2019 | |
| CN | 110287869 A | * | 9/2019 | ......... G06K 9/00657 |
| CN | 110909679 A | | 3/2020 | |
| CN | 108764688 B | * | 11/2021 | ....... G06Q 10/06393 |
| KR | 101703442 B1 | * | 2/2017 | ........... G06T 3/4038 |
| WO | WO 2020/055950 A1 | | 3/2020 | |
| WO | WO 2021/007352 A1 | | 1/2021 | |
| WO | WO-2021/041666 A1 | | 3/2021 | |
| WO | WO 2021/062147 A1 | | 4/2021 | |
| WO | WO 2021/062177 A1 | | 4/2021 | |
| WO | WO 2021/007352 A8 | | 8/2021 | |

(56) References Cited

FOREIGN PATENT DOCUMENTS

WO     WO 2021/222763 A1     11/2021
WO     WO 2022/020448 A1     1/2022

OTHER PUBLICATIONS

Bratten, "LandsatLinkr 0.1.4User Guide," Guide version 0.1.4a draft (2015).
International Search Report and Written Opinion for International Application No. PCT/US2020/048188 mailed Nov. 13, 2020.
Zhang et al., "Mapping paddy rice planting areas through time series analysis of MODIS land surface temperature and vegetation index data," ISPRS Journal of Photogrammetry and Remote Sensing, 106: 157-171 (2015).
Lin, X. et al., "Carbon Emissions Estimation and Spatiotemporal Analysis of China at City Level Based on Multi-Dimensional Data and Machine Learning," Remote Sensing 14(13), 3014, Jun. 23, 2022, pp. 1-18.
Luo, D. et al., "Integrated Carbon Footprint and Economic Performance of Five Types of Dominant Cropping Systems in China's Semiarid Zone," Sustainability 14(10), 5844, May 11, 2022, pp. 1-17.
PCT International Search Report and Written Opinion, PCT Application No. PCT/US2023/078118, Feb. 22, 2024, 11 pages.
Aji, A. et al., "Hadoop-GIS: A High Performance Spatial Data Warehousing System over MapReduce," Proceedings VLDB Endowment 6(11), Aug. 2013, pp. 1009-1020.
Becker-Reshef, I. et al., "Prior Season Crop Type Masks for Winter Wheat Yield Forecasting: A US Case Study," Remote Sensing, 10: 1659, Oct. 19, 2018, pp. 1-20.
Bermudez, C., "Development of a remote sensing protocol for inventorying cover crop adoptions," Iowa State University Master of Science Thesis, 2016, pp. 1-80.
European Patent Office, Extended European Search Report, EP Patent Application No. 21796375.0, Dec. 19, 2023, nine pages.
European Patent Office, Extended European Search Report, EP Patent Application No. 20836088.3, Jun. 14, 2023, ten pages.
Gao, F. et al., "A within-season approach for detecting early growth stages in corn and soybean using high temporal and spatial resolution imagery," Remote Sens Environ, vol. 242: 111752, Mar. 2020, pp. 1-19.
Kuzyakova, I.F. et al., "Time series analysis and mixed models for studying the dynamics of net N mineralization in a soil catena at Gondelsheim (S-W Germany)," Geoderma, vol. 136, Sep. 7, 2006, pp. 803-818.
PCT International Search Report and Written Opinion, PCT Application No. PCT/US2021/042542, Oct. 24, 2021, nine pages.
PCT International Search Report and Written Opinion, PCT International Application No. PCT/US2020/041256, Oct. 5, 2020, 13 pages.
PCT International Search Report and Written Opinion, PCT International Application No. PCT/US2020/052706, Dec. 7, 2020, eight pages.
PCT International Search Report and Written Opinion, PCT International Application No. PCT/US2020/052755, Feb. 11, 2021, eight pages.
PCT International Search Report and Written Opinion, PCT International Application No. PCT/US2021/030196, Aug. 4, 2021, 12 pages.
Vorobiova, N.S. et al., "NOVI time series modeling in the problem of crop identification by satellite images," Information Technology and Nanotechnology, 2016, pp. 428-436.
Wang, H. "A Large-scale Dynamic Vector and Raster Data Visualization Geographic Information System Based on Parallel Map Tiling," FIU Electronic Theses and Dissertations, Nov. 8, 2011, pp. 1-77.
Wardlow et al., "Discriminating cropping patterns in the US Central Great Plains region using time-series MODIS 250-meter NOVI data-Preliminary Results," In Proceedings, Pecora 15 and Land Satellite Information IV Conference, 2002, pp. 1-12.
Xie, Y. et al., "Mapping irrigated cropland extent across the conterminous United States at 30 m resolution using a semi-automatic training approach on Google Earth Engine," ISPRS Journal of Photogrammetry and Remote Sensing, vol. 155, Sep. 2019, pp. 136-149.
Github, "cogeo-mosaic," Jun. 13, 2019, pp. 1-11, [Online] Retrieved from the Internet <URL: https://github.com/developmentseed/mosaicjson-spec>.
Github, "Marblecutter," Jul. 31, 2017 pp. 1-4, [Online] Retrieved from the Internet <URL:https://github.com/mojodna/marblecutter>.
Github, "rio-tiler," Oct. 14, 2020, pp. 1-14, [Online] Retrieved from the Internet <URL:https://github.com/cogeotiff/rio-tiler>.
Github, "Terracotta," Mar. 6, 2018, pp. 1-5, [Online] Retrieved from the Internet <URL:https://github.com/DHI/terracotta>.
PCT International Search Report and Written Opinion, PCT Application No. PCT/US2023/085208, Apr. 29, 2024, eight pages.
United States Office Action, U.S. Appl. No. 18/051,789, Apr. 18, 2024, six pages.

\* cited by examiner

IMAGERY-BASED BOUNDARY IDENTIFICATION FOR AGRICULTURAL FIELDS

CROSS-REFERENCE TO RELATED APPLICATIONS

This application is a continuation of International Application No. PCT/US2020/048188, filed Aug. 27, 2020, which claims the benefit of U.S. Provisional Application No. 62/892,110, filed Aug. 27, 2019, each of which is hereby incorporated by reference in its entirety.

BACKGROUND

Embodiments of the present disclosure relate to remote sensing, and more specifically, to imagery-based boundary identification for agricultural fields.

BRIEF SUMMARY

According to embodiments of the present disclosure, methods of and computer program products for agricultural field boundary identification are provided. A time series of surface reflectance rasters for a geographic region is received. For each of the surface reflectance rasters, at least one index raster is determined, yielding at least one time series of index rasters. The at least one time series of index rasters is divided into a plurality of consecutive time windows. The at least one time series of index rasters is composited within each of the plurality of time windows, yielding a composite index raster for each of the at least one time series of index rasters in each of the plurality of time windows. The composite index rasters are segmented into a plurality of spatially compact regions of the geographic region. A plurality of polygons is generated from the plurality of spatially compact regions, each of the plurality of polygons corresponding to an agricultural field in the geographic region.

In some embodiments, the time series of surface reflectance rasters comprises satellite data. In some embodiments, the time series of surface reflectance rasters spans a growing season in the geographic region. In some embodiments, receiving the time series of surface reflectance rasters comprises determining surface reflectance from uncorrected reflectance data.

In some embodiments, the at least one index raster comprises a normalized difference vegetation index raster. In some embodiments, the at least one index raster comprises a land surface water index raster. In some embodiments, the at least one index raster comprises a mean brightness raster. In some embodiments, determining the at least one index raster comprises downsampling the surface reflectance rasters.

In some embodiments, the plurality of consecutive time windows correspond to early, mid-, and late phases of a growing season in the geographic region. In some embodiments, compositing comprises averaging the at least one time series of index rasters within each of the plurality of time windows.

In some embodiments, segmenting comprises filling missing pixels in the composite index rasters. In some embodiments, filling missing pixels comprises applying linear interpolation to the composite index rasters. In some embodiments, segmenting comprises normalizing the composite index rasters. In some embodiments, segmenting comprises denoising. In some embodiments, denoising comprises applying a spatial low pass filter. In some embodiments, segmenting comprises graph-based segmentation. In some embodiments, segmenting comprises Felzenszwalb segmentation.

In some embodiments, generating the plurality of polygons comprises applying spatial smoothing to the plurality of spatially compact regions.

DETAILED DESCRIPTION

Figure 1:
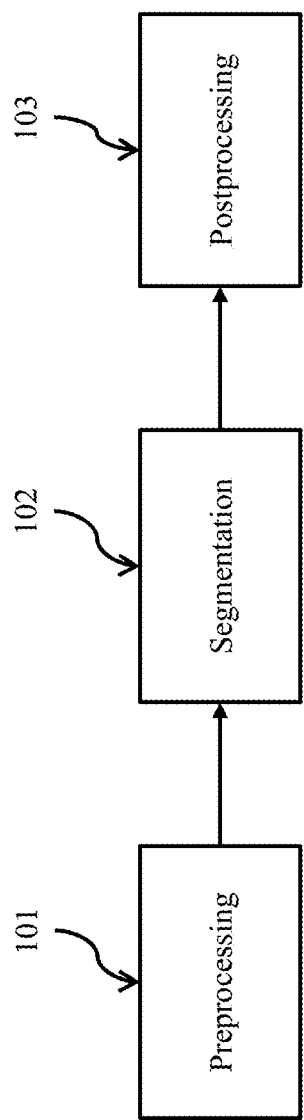
FIG. 1 illustrates a field delineation pipeline according to embodiments of the present disclosure.

Farm fields represent a fundamental spatial unit of agriculture. Observation, analysis, and modeling of agricultural characteristics at the farm field level requires specification of their geographic boundaries. However, there is no standard reference data set for farm field boundaries.

While field boundaries can be created by manual digitization, whether by on-site data collection or manual markup of aerial or satellite imagery coupled with on-site verification, this process is not scalable to large areas. Individual US counties can contain thousands of fields, and the US as a whole contains millions of fields. Manually digitizing hundreds or thousands of fields would be prohibitively time consuming. Moreover, agricultural activity often shifts from season to season, utilizing different parts of a given field. Accordingly, the geographic definition of the field must be allowed to change over time, putting a temporal constraint on the validity of a given field identification.

As used herein, a field boundary refers to a spatially compact (that is, closed and bounded) unit of the landscape that exhibited an approximately uniform pattern temporally and spectrally for a given growing season. In particular, field boundary delineates a bounded area with common crop type and management. A field boundary may differ from what visual inspection of a single image might suggest. For example, visual inspection is likely to be strongly affected by the presence of roads, streams, paths, or other such boundaries, irrespective of whether a crop was actually grown on the land in question.

Various image processing algorithms may be used to partition images into coherent spatial units (segmentation) based on detection of boundaries in the image. In this way, satellite data at sufficient spatial resolution may be used to create farm field boundaries. However, a given static image does not contain sufficient information to produce an accurate boundary. For example, at any given time, two adjacent fields might appear as one field in an image. Similarly, satellite data contain generally multiple spectral reflectance bands, which can be combined algebraically to produce indices, but no single index is guaranteed to provide distinguishing power to resolve between fields. Even if satellite information alone were sufficient to delineate fields, a general segmentation approach would not delineate fields alone, but all image content with a discernable boundary.

Accordingly, there is a need for field boundary detection approaches that leverage spectral, temporal, and spatial information in remote sensing imagery to create high confidence boundaries suitable for downstream processes, free of non-field boundaries.

The present disclosure provides systems, methods, and computer program products for automated identification of field boundaries in remote sensing imagery that exploits spectral, temporal, and spatial patterns in the data to create a geospatial data set (e.g., polygonal features) indicative of field boundaries.

With reference now to FIG. 1, an exemplary field delineation pipeline is illustrated according to embodiments of the present disclosure. In various embodiments, the field delineation pipeline includes three sequential steps: preprocessing 101, in which precursor images are created to enable an accurate characterization of boundaries; segmentation 102, in which an appropriate combination of filters is applied to the imagery prior to segmentation; and post-processing 103, in which contextual and geometric screening is performed to remove boundaries that are determined to not be fields.

Figure 2:
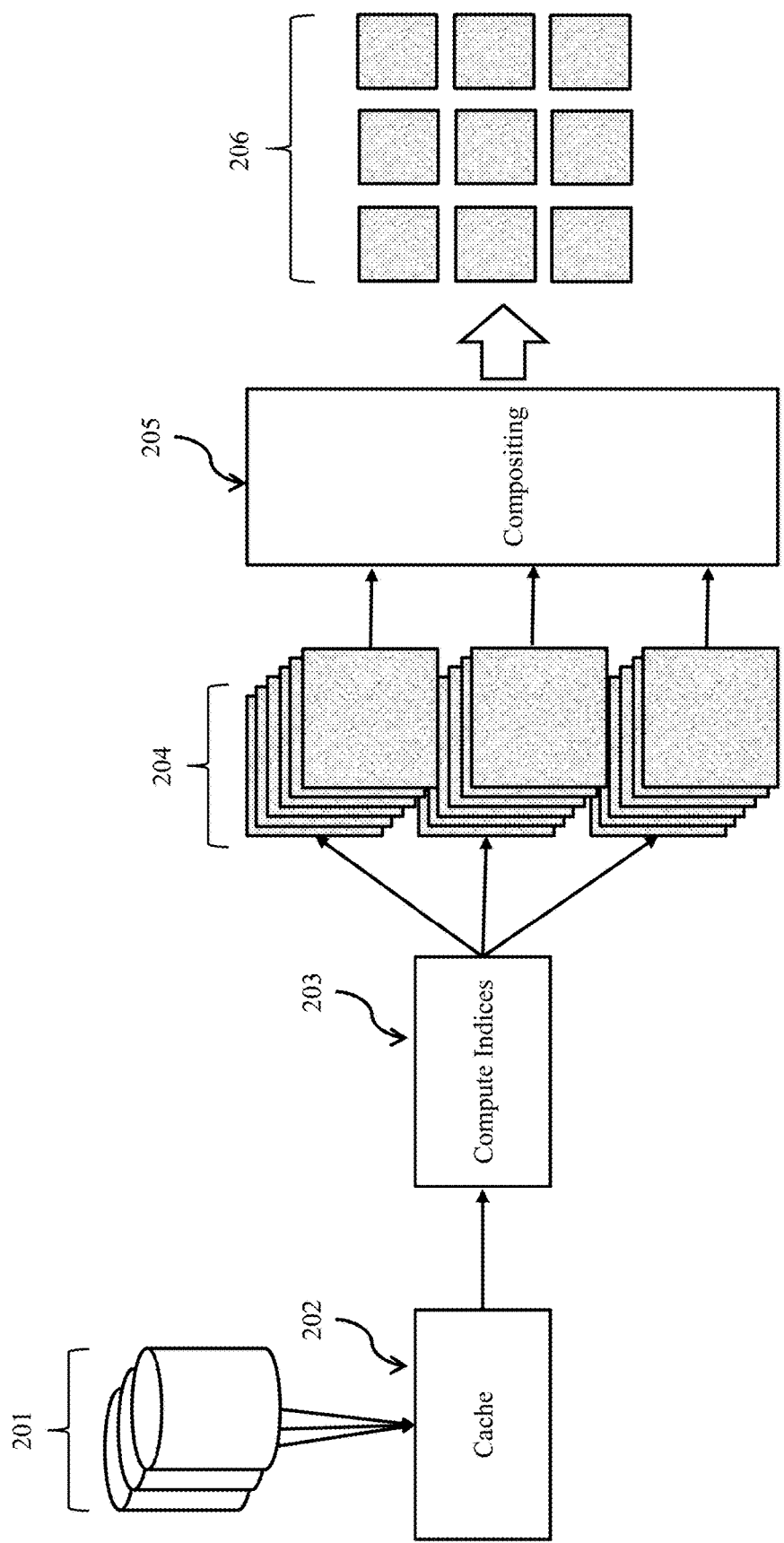
FIG. 2 illustrates an image preprocessing method according to embodiments of the present disclosure.

Referring to FIG. 2, an exemplary preprocessing method is illustrated according to embodiments of the present disclosure. It will be appreciated that the quality and particular characteristics of the input imagery used to create boundaries is important to accurate results from the delineation algorithms provided herein.

Remote sensing data are retrieved from one or more datastore 201. In various embodiments, remote sensing data comprise satellite data including surface reflectance at a plurality of resolutions, at a plurality of times. In some embodiments, the datastore is the NASA Harmonized Landsat-Sentinel2 (HLS) product archive. HLS takes advantage of the complementary overpass times of Landsat and Sentinel2, to provide denser coverage in time, but with uniform radiometric and geospatial characteristics. In some embodiments datastore 201 contains uncorrected reflectance data, which is converted to surface reflectance prior to use (e.g., by cloud mapping and atmospheric correction). It will be appreciated, however, that a variety of alternative satellite systems are suitable for providing data as set out herein.

In various embodiments, remote sensing data are fetched and stored in a local cache 202 for further processing. It will be appreciated, however, that in some embodiments, data may be read directly from a local datastore, or may be streamed directly from a remote data store without the need for local caching.

In some embodiments, the Geospatial Intelligence Production Solution (GIPS) is used for data retrieval. GIPS is an open source solution that provides a uniform interface to a wide range of satellite, weather, and other geospatial data sources. However, it will be appreciated that a variety of alternative APIs and platforms may be used to retrieve suitable satellite data.

The remote sensing data is processed to compute 203 one or more indices 204 for each point in time for which data is available at each pixel of the input images. In some embodiments, surface reflectance images (e.g., from HLS) are processed to create a three-band product consisting of normalized difference vegetation index (NDVI), land surface water index (LSWI), and mean brightness (BRGT). These three indices represent the three principal axes of variability of optical data, and may be referred to as greenness, wetness, and brightness. In the example shown, each of three indices contains a plurality of snapshots in time. Each snapshot is a raster, or image, whose pixel intensity indicates the index value.

In alternative embodiments, different indices are selected, resulting in a different number of bands. For example, in some embodiments, the brightness band described above is omitted. Brightness, greenness, and wetness are generally the most dominant modes of variability for optical remote sensing bands. However, it will be appreciated that a variety of different combinations of bands and specific computation of bands may be used for field delineation according to the present disclosure. For example, Enhanced Vegetation Index (EVI) or EVI2 may be used in place of NDVI.

Omitting the brightness band reduces the number of subfield segments by 13%-43%, depending on terrain, resulting in a weighted mean decrease of 22% over an exemplary selection of tiles. Further comparison to manual field boundaries may be made using Intersection Over Union (IOU), which is a measure of agreement between two sets of polygons. It refers to the ratio of the intersected area of the polygons to the union. For the two groups of fields (hand drawn, and auto-delineated) this measure is assymetric with respect to each set. GDF1 is used herein to refer to the mean comparison of each manually delineated field to autodelineated fields. GDF2 is used herein to refer to the mean comparison of each autodelineated field to manual fields. In the present example, GDF2 IOU increased by 13%-84%, yielding a weighted mean increase of 33%. GDF1 IOU was about the same.

Remote sensing data may be available on an irregular schedule, for example due to orbital periods of a given constellation. The HLS source images are provided irregularly in time, and may contain gaps which propagate into the indices. To address this variability, in some embodiments, the index images are composited 205 within pre-specified time windows, enabling delivery of a small number of high-value variables for use in the downstream algorithms. It will be appreciated that various techniques may be used to composite the source images prior to index computation. However, compositing the index images is advantageous as it reduces noise and lowers the dimensionality of the problem, thereby enabling more efficient computation.

In some embodiments, the predetermined time windows correspond to phases of the growing season. In some embodiments, the time windows correspond to the early growing season, the mid-season, and the late growing season for a given crop. In an exemplary embodiment, a first window spans April and May, a second window spans June and July, and a third window spans August and September. It will be appreciated that these exemplary windows are calibrated to the northern hemisphere, and would be transposed by six months for use in the southern hemisphere. It will also be appreciated that while these windows are suitable for the continental US, they may be shortened or lengthened for certain crops at certain higher or lower latitudes.

In various embodiments, a user is able to define the number of time windows, and the start and end date of each window separately. This approach allows the delineation of field boundaries for each specific season, or at multiple times within a season, capturing potential changes in the use of the land. For example, a field could be farmed in its entirety for a cash crop, then part of the field subsequently could be used for a cover crop. Similarly, different indices may be used for different conditions or different geographies.

In various embodiments, compositing 205 comprises performing a temporal linear interpolation to reduce potential bias from having the distribution of measurements in time significantly different for different places. In some such embodiments, linear interpolation is performed between available observations, which due to clouds and overpass constraints, may not be evenly distributed in time. After interpolation, for each pixel, the average in time within a window is taken. In an exemplary embodiment in which three indices are assessed over three time windows, the result is a nine band (3 indices×3 windows) image stack 206.

It will be appreciated that the above process may be performed for a global data set, or only for certain areas of interest. In some embodiments, the resulting image stack is downsampled to a predetermined resolution in order to limit the overall storage size necessary to maintain the image stacks. In some embodiments, the target resolution is 0.15 degrees. This resolution allows for storage of a global dataset while providing sufficient resolution for further downstream processing.

Figure 3:
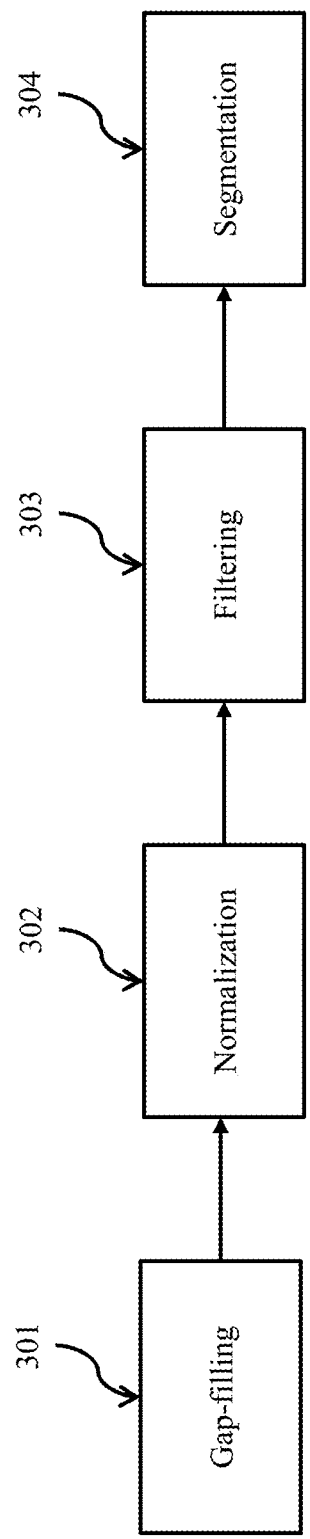
FIG. 3 illustrates an image segmentation method according to embodiments of the present disclosure.

Referring to FIG. 3, an exemplary segmentation method is illustrated according to embodiments of the present disclosure. As set out below, once the image data are available from the preprocessing stage, a series of numerical image processing steps are performed. The combination of pre-segmentation steps (gap-filling, scaling, noise filtering) contribute to the reliability of the segmentation results.

At 301, gaps are filled in the available multi-temporal multi-index imagery. Even after compositing, some data sets contain residual missing pixels which must be addressed. In some embodiments, gap-filling comprises applying linear interpolation to gap fill these residual missing values. The post-compositing gaps are typically very small (1-10 pixels), making linear interpolation sufficient.

At 302, the images corresponding to each index are normalized. This addresses the potential for each variable to have a different dynamic range. In some embodiments, normalizing comprises rescaling. In some embodiments, normalizing comprises quantizing. In some embodiments, all bands are normalized by subtracting the mean and dividing the result by its standard deviation.

At 303, the images are filtered. In some embodiments, filtering comprises applying a denoising filter. In some embodiments, the denoising filter is the scikit-image restoration.denoise_bilateral filter for spatial and variable-wise smoothing. This filter removes noise by applying a spatial low pass filter that does not smooth over features that appear consistently in the nine bands.

In various embodiments, an edge-preserving, denoising filter is used (such as those provided by scikit-image restoration). Such filters average pixels based on their spatial closeness and radiometric similarity. In various embodiments, spatial closeness is measured by the Gaussian function of the Euclidean distance between two pixels and a configurable standard deviation value (denoted sigma spatial in scikit-image restoration). A larger value of the standard deviation for range distance results in averaging of pixels with larger spatial differences. In various embodiments, the standard deviation value is 0.1, 0.5, 0.8, or 0.9. A value of 0.5 or lower results in situations in which the auto-delineated fields may have four times or more polygons than manually delineated fields, which is undesirable.

In various embodiments, spatial closeness is measured by the Gaussian function of the Euclidean distance between two color values and a configurable standard deviation value (denoted sigma_color in scikit-image restoration). A larger value of the standard deviation for range distance results in averaging of pixels with larger radiometric differences. In various embodiments, the image is converted using the img_as float function (of the scikit-image restoration library) and thus the standard deviation is in respect to the range [0, 1]. If the value is none, the standard deviation of the image is used. In various embodiments, the standard deviation value is none, 0.3, 0.5, 0.8. In testing, changing this parameter did not change GDF1 IOU, GDF2 IOU, or the resulting number of field polygons.

At 304, image segmentation is performed. In some embodiments, segmentation is performed by graph-based image segmentation. In some embodiments, the Felzenszwalb method for efficient graph-based image segmentation is used. In some embodiments, segmentation is implemented using the scikit-image segmentation.felzenszwalb algorithm. This exemplary algorithm creates a single layer representing raster classes with labels such that the labeled classes are spatially compact parcels of land. The resulting parcels correspond to distinct units of the landscape, ready for postprocessing to generate vector features of farm fields.

In various embodiments, such as those implemented with the segmentation.felzenszwalb algorithm, the observation level is configurable via a scale value. Higher scale generally means fewer, larger segments. Segment size within an image can vary greatly depending on local contrast, so scale is scene dependent. However, in some embodiments a consistent scale value is applied for all scenes. Exemplary scale values include scale: 550, 600, 650, 700, and 750. Across these ranges, the max difference in GDF1 IOU is only about 1-2%. There is not a clear dominant scale that produces significantly better results across all test tiles. GDF2 IOU is more strongly and inversely related to scale (~5-6% difference between 550 and 750).

In various embodiments, such as those implemented with the segmentation.felzenszwalb algorithm, the diameter (standard deviation) of a Gaussian kernel used for smoothing the image prior to segmentation is configurable. This value may be denoted as sigma. Exemplary values of sigma include 0.5, 0.8, and 0.9. Across this parameter range, the maximum difference in GDF1 IOU is about 1%. However, the number of polygons varies significantly, with higher sigma (smoothing) values correlated with fewer, larger segments. It is preferable to use higher values that still maintain segments that do not cross field boundaries, such as 0.9.

Figure 4A:
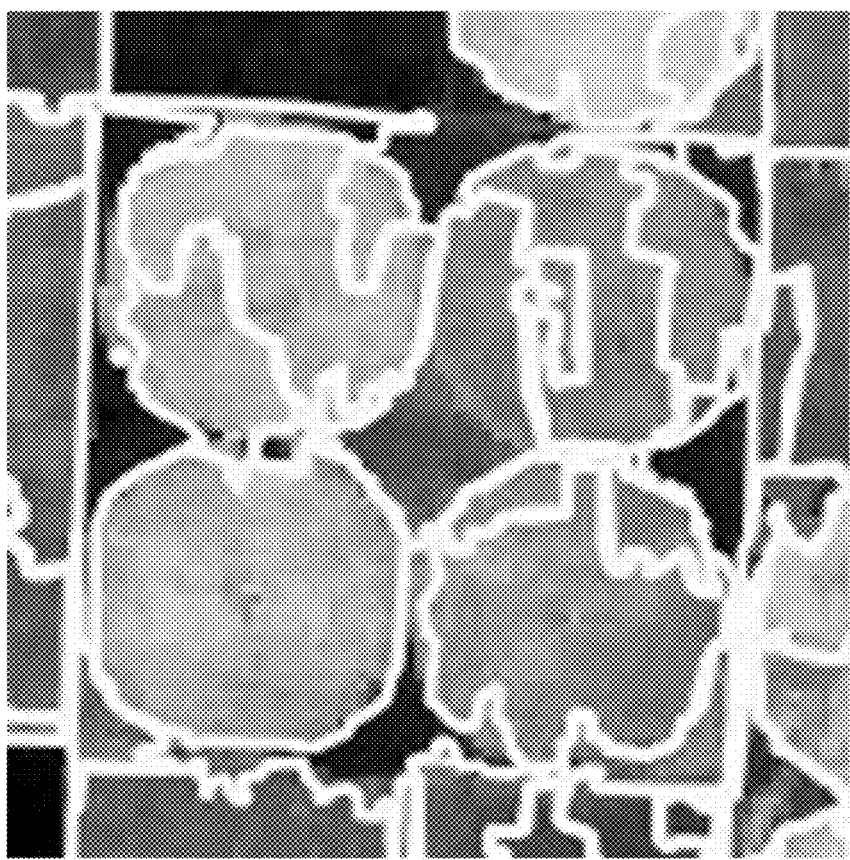
FIGS. 4A-B illustrate exemplary image segmentations according to embodiments of the present disclosure.
Figure 4A:
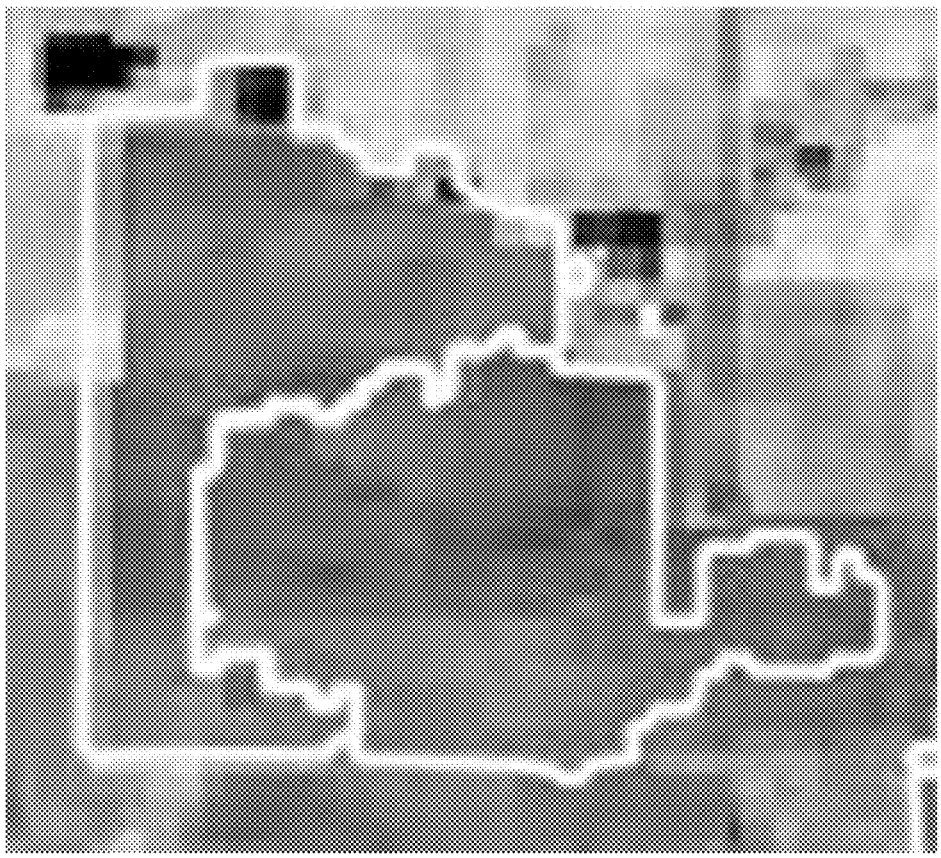
Figure 4B:
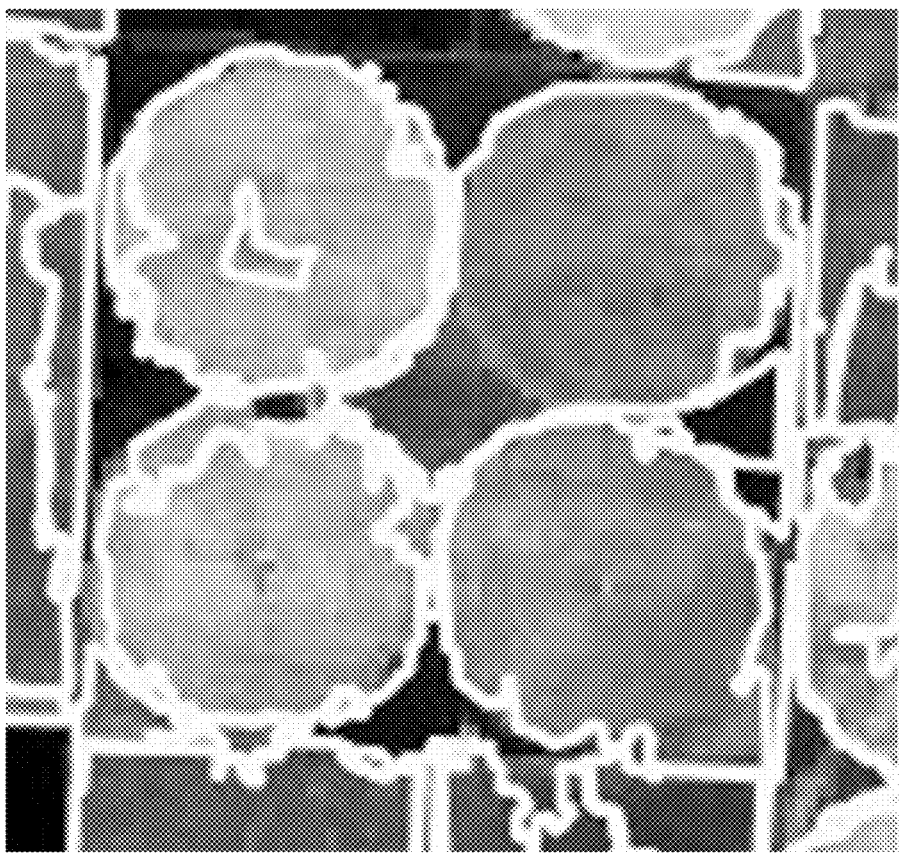
Figure 4B:
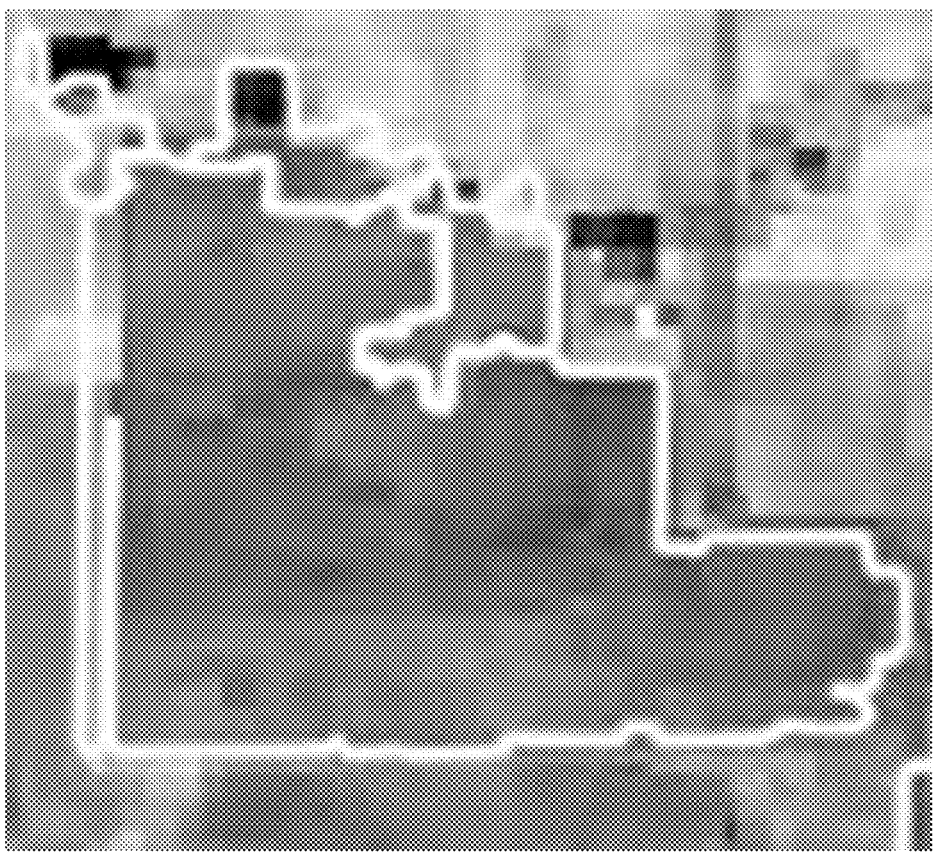

Referring to FIGS. 4A-B, exemplary segmentations with variable sigma values are illustrated. In FIG. 4A, a sigma value of 0.8 is used. In FIG. 4B, a sigma value of 0.9 is used. As shown, a high value results in larger contiguous segments.

In various embodiments, such as those implemented with the segmentation.felzenszwalb algorithm, the minimum component size is configurable, which is enforced using post processing. This value may be denoted as min_size. Exemplary values for this value include 500, 600, and 700. Across this parameter range, the maximum difference in both GDF1 IOU and GDF2 IOU is about 1-2%. There is also an insignificant change in the number of polygons. In all cases, min_size=700 has the best IOU, but not by a significant margin.

Figure 5:
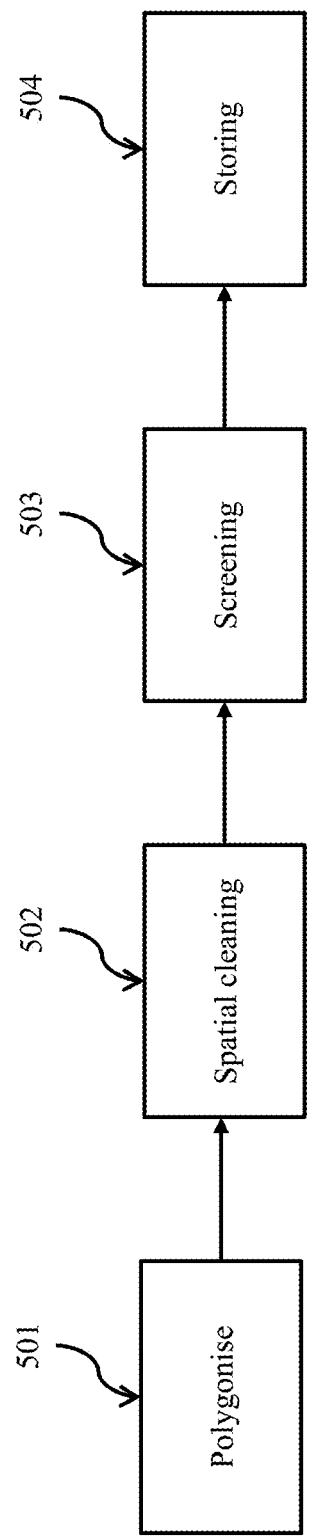
FIG. 5 illustrates a segmentation postprocessing method according to embodiments of the present disclosure.

Referring to FIG. 5, an exemplary postprocessing method is illustrated according to embodiments of the present disclosure.

At 501, the segmented images are polygonised to create candidate field polygons in vector format based on raster classes. In some embodiments, the segmented images are polygonised using GDAL polygonise.

At 502, the polygons are spatially cleaned. Spatial cleaning includes checking topological validity, fixing broken geometries (such as non-closed polygons), and removing complex shapes that are unlikely to represent all or part of a farm field. In some embodiments, complex shapes are identified by computing the area of the convex hull surrounding the polygon, divided by the area of the polygon. In some embodiments, perimeter to area ratio is used. Additional suitable metrics include: eccentricity (the maximum of the set of shortest distances from each vertex, to all vertices in the polygon); equivalent diameter (the diameter of the smallest circle containing the polygon); perimeter to area ratio; and the ratio of minor axis to major axis of the smallest ellipse containing the polygon. Heuristics may be applied to evaluate whether a polygon falls within the reasonable range of field geometries. For example, polygons outside of predetermined size thresholds may be discarded. Similarly, polygons with too high an aspect ratio may be discarded. Across all parameters tested, the max difference in GDF1 and GDF2 IOU is about 3-4%. Larger opening values result in fewer polygons, however, parts of legitimate fields may be missed. Larger values also result in rounded field edges In some embodiments, spatial cleaning comprises applying spatial smoothing such as a buffer and reverse buffer cycle. In various embodiments, the buffer size (or opening) is configurable. The buffering removes morphologically inconsistent pieces of polygons, such as long, narrow strips between fields that erroneously connect two distinct fields. The larger the opening, the more artifacts are removed, but additional edges of the remaining field boundaries are rounded. Accordingly, there is a tradeoff between boundary accuracy/fidelity and problematic artifacts. Exemplary buffer size values include 1, 5, 10, and 20 meters.

Figure 6A:
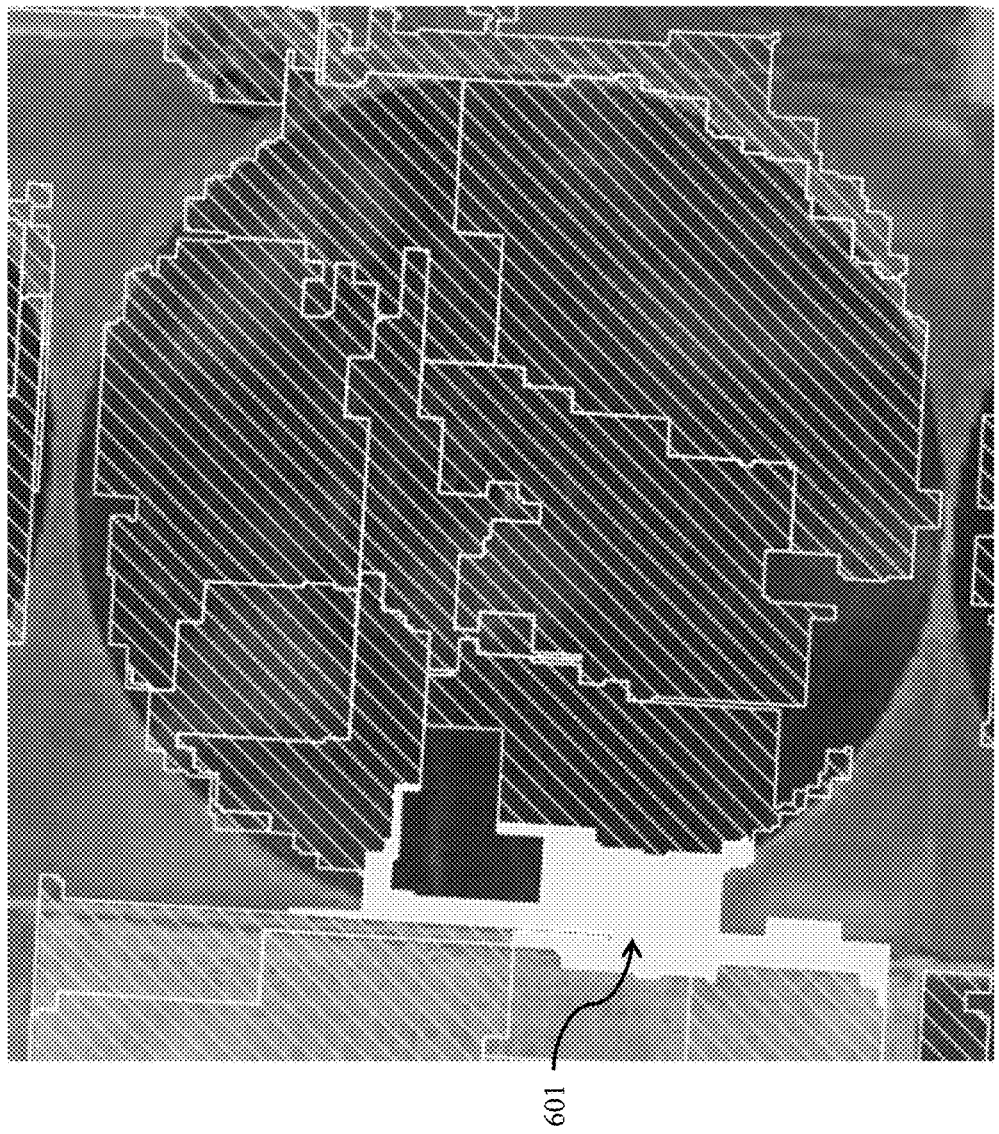
FIGS. 6A-B illustrate exemplary image segmentations according to embodiments of the present disclosure.
Figure 6B:
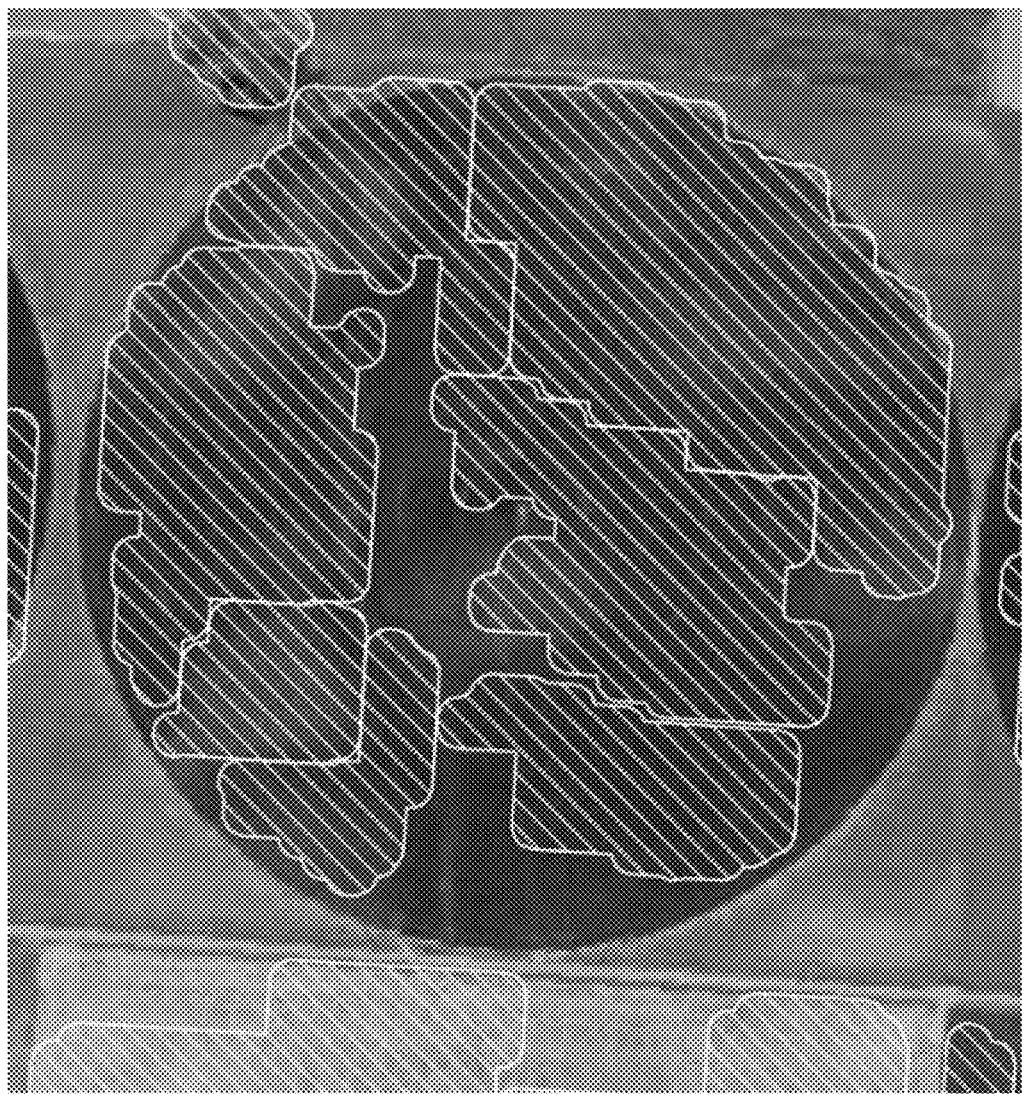

Referring to FIGS. 6A-B, exemplary segmentations using variable buffer size are shown. In FIG. 6A, a buffer size of 1 is used. Region 601 is an example of geometry that should be removed during the spatial cleaning step. FIG. 6B shows the result after spatial cleaning with a buffer size of 20. Region 601 is removed, and the remaining fields appear with rounded corners.

At 503, the polygons are screened to remove non-crop records. In some embodiments, screening comprises comparing the polygons against a reference layer of crop data, such as the USGS Crop Data Layer (CDL). In some embodiments, polygons that lie outside known croplands are discarded.

At 504, the resulting field polygons are stored for further use, such as visualization. In some embodiments, the field polygons are organized in tiles for efficient retrieval of relevant data for a given problem. In some embodiments, the field polygons are stored with additional metadata, such as a historical crop type or other attributes derived from remote sensing data or drawn from additional data layers.

Figure 7A:
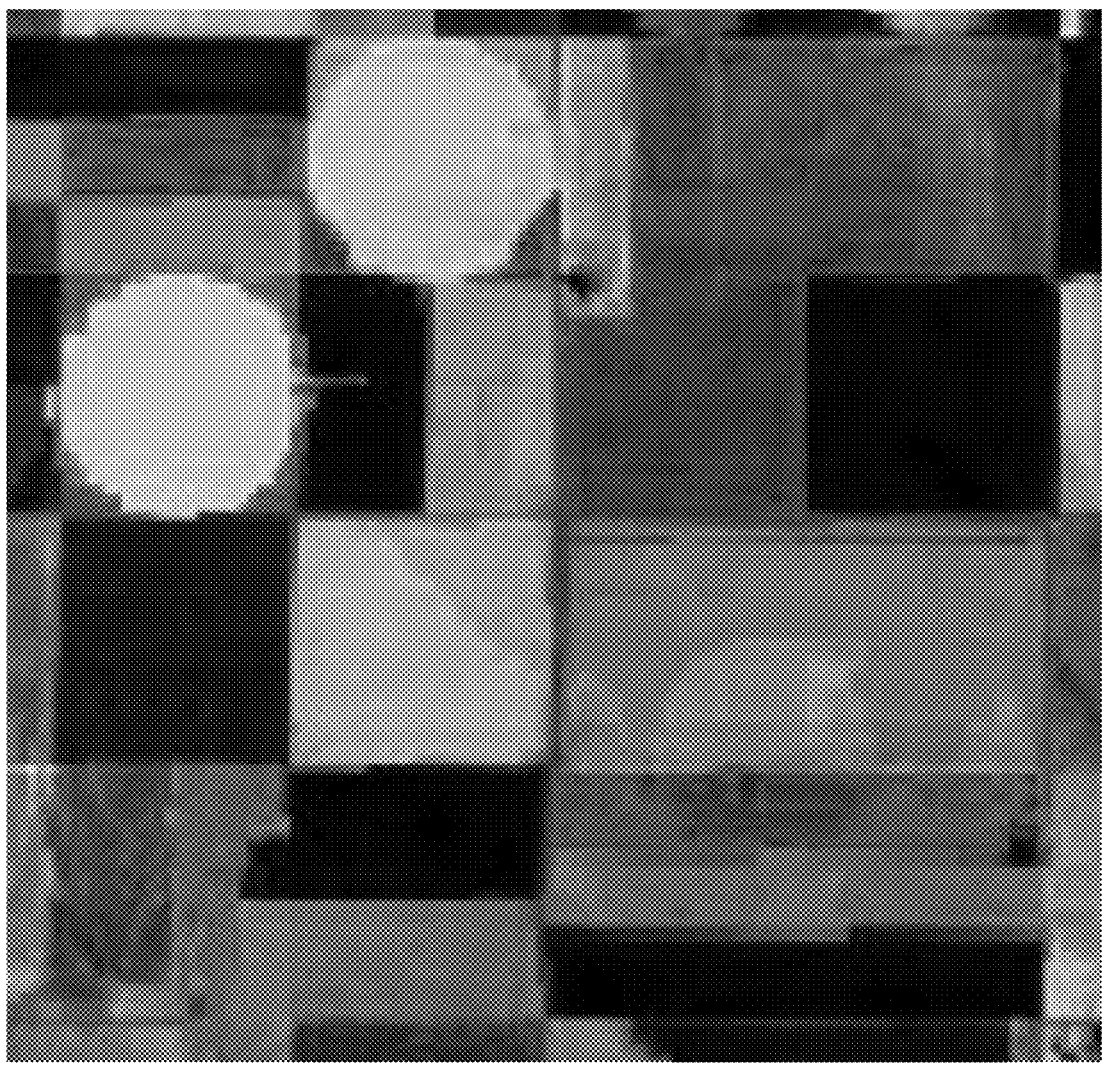
FIGS. 7A-B illustrate exemplary field boundaries according to embodiments of the present disclosure.
Figure 7B:
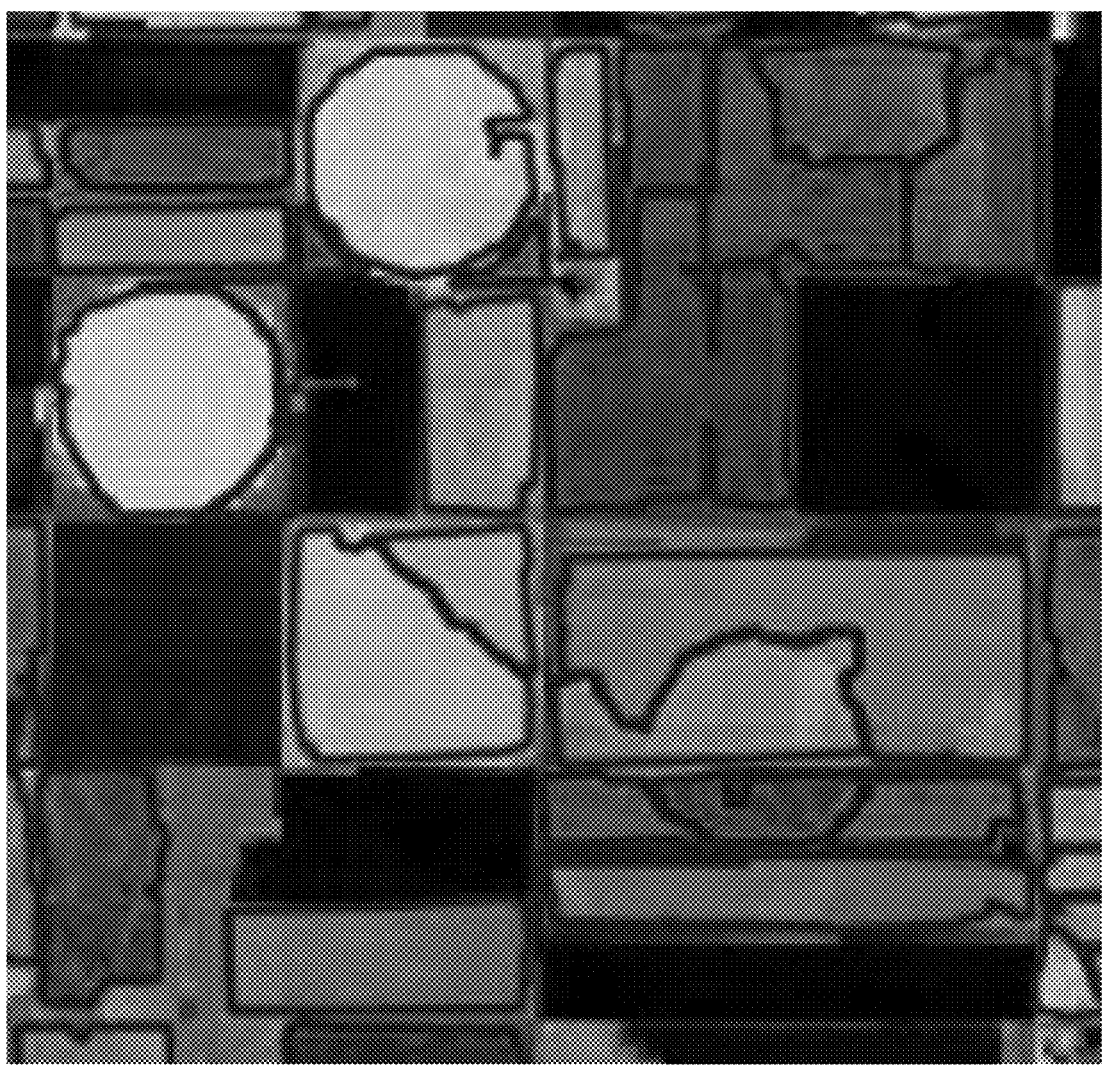

Referring to FIGS. 7A-B, exemplary field boundaries are illustrated according to an embodiment of the present disclosure. FIG. 7A shows a multitemporal/multispectral image tile such as would result from the preprocessing stage described above. FIG. 7B shows the same image tile with automatically delineated fields superimposed.

Figure 8:
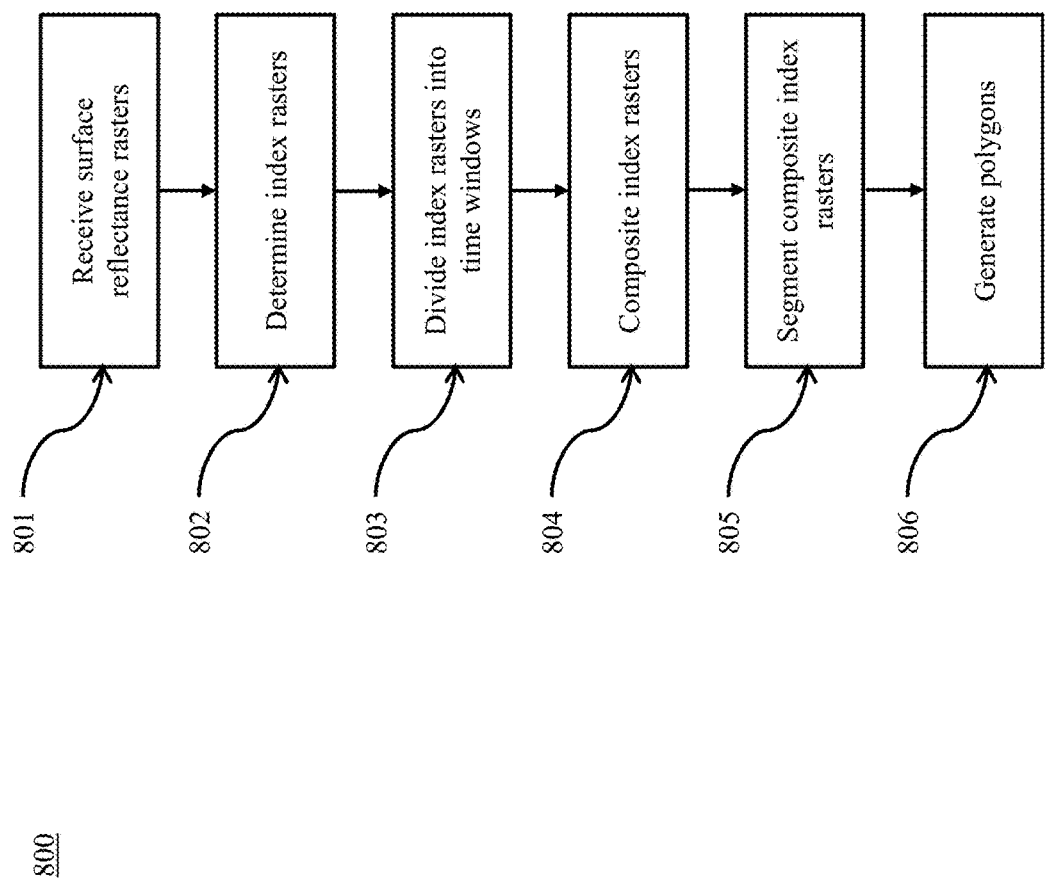
FIG. 8 illustrates a method for agricultural field boundary identification according to embodiments of the present disclosure.

Referring to FIG. 8, a method for agricultural field boundary identification is illustrated according to embodiments of the present disclosure. At 801, time series of surface reflectance rasters for a geographic region is received. At 802, for each of the surface reflectance rasters, at least one index raster is determined, yielding at least one time series of index rasters. At 803, the at least one time series of index rasters is divided into a plurality of consecutive time windows. At 804, the at least one time series of index rasters is composited within each of the plurality of time windows, yielding a composite index raster for each of the at least one time series of index rasters in each of the plurality of time windows. At 805, the composite index rasters are segmented into a plurality of spatially compact regions of the geographic region. At 806, a plurality of polygons is generated from the plurality of spatially compact regions, each of the plurality of polygons corresponding to an agricultural field in the geographic region.

Figure 9:
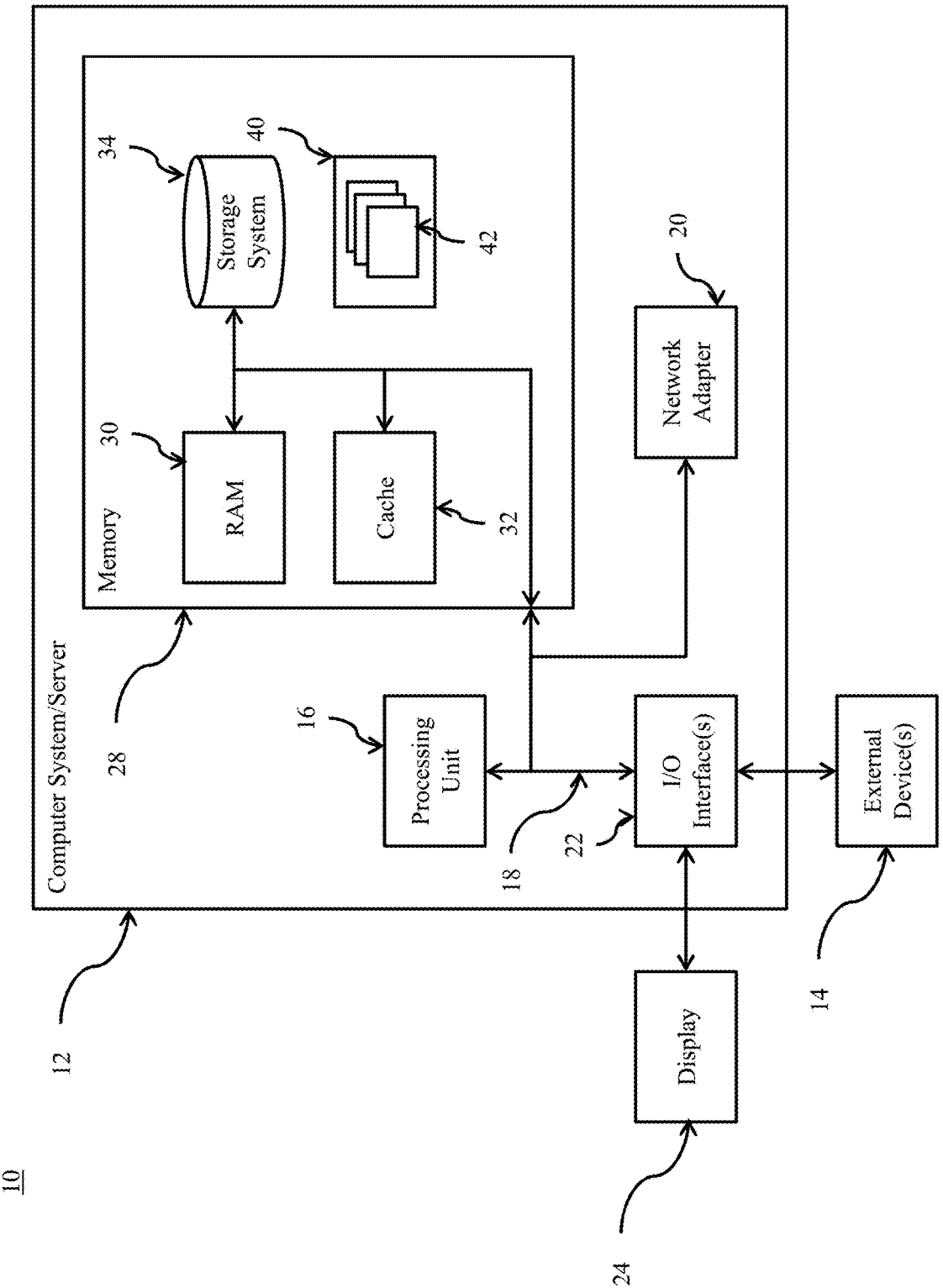
FIG. 9 depicts a computing node according to an embodiment of the present disclosure.

Referring now to FIG. 9, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a time series of surface reflectance rasters for a geographic region;
   determining, for each of the surface reflectance rasters, at least one index raster to produce one or more time series of index rasters;
   dividing one or more time series of index rasters into a plurality of consecutive time windows;
   compositing one or more time series of index rasters within each of the plurality of time windows, to produce a composite index raster for each of one or more time series of index rasters in each of the plurality of time windows;
   segmenting the composite index rasters into a plurality of spatially compact regions of the geographic region by denoising the composite index raster using a spatial low pass filter; and
   generating a plurality of polygons from the plurality of spatially compact regions, each of the plurality of polygons corresponding to an agricultural field in the geographic region.

2. The method of claim 1, wherein the time series of surface reflectance rasters comprises satellite data.

3. The method of claim 1, wherein the time series of surface reflectance rasters spans a growing season in the geographic region.

4. The method of claim 1, wherein receiving the time series of surface reflectance rasters comprises determining surface reflectance from uncorrected reflectance data.

5. The method of claim 1, wherein the at least one index raster comprises a normalized difference vegetation index raster.

6. The method of claim 1, wherein the at least one index raster comprises a land surface water index raster.

7. The method of claim 1, wherein the at least one index raster comprises a mean brightness raster.

8. The method of claim 1, wherein determining the at least one index raster comprises downsampling the surface reflectance rasters.

9. The method of claim 1, wherein the plurality of consecutive time windows correspond to early, mid-, and late phases of a growing season in the geographic region.

10. The method of claim 1, wherein compositing comprises averaging the at least one time series of index rasters within each of the plurality of time windows.

11. The method of claim 1, wherein segmenting comprises filling missing pixels in the composite index rasters.

12. The method of claim 11, wherein filling missing pixels comprises applying linear interpolation to the composite index rasters.

13. The method of claim 1, wherein segmenting comprises normalizing the composite index rasters.

14. The method of claim 1, wherein segmenting comprises graph-based segmentation.

15. The method of claim 1, wherein segmenting comprises Felzenszwalb segmentation.

16. The method of claim 1, wherein generating the plurality of polygons comprises applying spatial smoothing to the plurality of spatially compact regions.

17. A system comprising:
    a datastore comprising a time series of surface reflectance rasters for a geographic region; and
    a computing node comprising a computer readable storage medium having program instructions embodied therewith, the program instructions executable by a processor of the computing node to cause the processor to perform a method comprising:

receiving the time series of surface reflectance rasters for a geographic region;

determining, for each of the surface reflectance rasters, at least one index raster to produce one or more time series of index rasters;

dividing one or more time series of index rasters into a plurality of consecutive time windows;

compositing one or more time series of index rasters within each of the plurality of time windows, to produce a composite index raster for each of one or more time series of index rasters in each of the plurality of time windows;

segmenting the composite index rasters into a plurality of spatially compact regions of the geographic region by denoising the composite index raster using a spatial low pass filter; and generating a plurality of polygons from the plurality of spatially compact regions, each of the plurality of polygons corresponding to an agricultural field in the geographic region.

18. A computer program product for agricultural field boundary identification, the computer program product comprising a computer readable storage medium having program instructions embodied therewith, the program instructions executable by a processor to cause the processor to perform a method comprising:

receiving the time series of surface reflectance rasters for a geographic region;

determining, for each of the surface reflectance rasters, at least one index raster to produce one or more time series of index rasters;

dividing one or more time series of index rasters into a plurality of consecutive time windows;

compositing one or more time series of index rasters within each of the plurality of time windows, to produce a composite index raster for each of one or more time series of index rasters in each of the plurality of time windows;

segmenting the composite index rasters into a plurality of spatially compact regions of the geographic region by denoising the composite index raster using a spatial low pass filter; and generating a plurality of polygons from the plurality of spatially compact regions, each of the plurality of polygons corresponding to an agricultural field in the geographic region.

* * * * *